United States Patent
Fullman et al.

(10) Patent No.: US 11,485,342 B2
(45) Date of Patent: Nov. 1, 2022

(54) SYSTEM AND METHOD FOR DYNAMIC BRAKE CALIBRATION

(71) Applicant: MANDO CORPORATION, Gyeonggi-do (KR)

(72) Inventors: Edward Carl Fullman, Bay City, MI (US); Bryan Freed, Bay City, MI (US); Robert Hill, Bay City, MI (US)

(73) Assignee: MANDO CORPORATION, Gyeonggi-Do (KR)

( * ) Notice: Subject to any disclaimer, the term of this patent is extended or adjusted under 35 U.S.C. 154(b) by 568 days.

(21) Appl. No.: 16/663,327

(22) Filed: Oct. 24, 2019

(65) Prior Publication Data
US 2020/0339095 A1    Oct. 29, 2020

Related U.S. Application Data

(60) Provisional application No. 62/839,616, filed on Apr. 27, 2019.

(51) Int. Cl.
*B60T 8/24* (2006.01)
*B60T 17/22* (2006.01)
(Continued)

(52) U.S. Cl.
CPC .............. *B60T 17/221* (2013.01); *B60T 8/17* (2013.01); *B60T 8/172* (2013.01); *B60T 8/176* (2013.01);
(Continued)

(58) Field of Classification Search
CPC .......... B60T 17/221; B60T 8/17; B60T 8/172; B60T 8/176; B60T 8/321; B60T 8/58;
(Continued)

(56) References Cited

U.S. PATENT DOCUMENTS

| | | | | |
|---|---|---|---|---|
| 6,405,117 | B1 * | 6/2002 | Walenty | B60T 17/221 73/121 |
| 2009/0091180 | A1 * | 4/2009 | Iwasaki | B60T 8/90 303/11 |

(Continued)

FOREIGN PATENT DOCUMENTS

KR    10-2018-0004953    1/2018

*Primary Examiner* — Shardul D Patel
(74) *Attorney, Agent, or Firm* — Ladas & Parry, LLP

(57) ABSTRACT

A control system for a vehicle having vehicle wheels comprises: brakes, wherein each of the brakes applies individual braking to a respective one of the vehicle wheels; memory storing brake characteristic parameters for controlling each of the brakes; and a processor configured to: calculate anticipated yaw, steering torque, and deceleration of the vehicle, associated with operation of the brakes; compare between the anticipated yaw and actual yaw of the vehicle, between the anticipated steering torque and actual steering torque of the vehicle, and between the anticipated deceleration and actual deceleration of the vehicle; and calibrate the brakes by adjusting the stored brake characteristic parameters of each of the brakes in response to a yaw difference between the anticipated yaw and the actual yaw, a steering torque difference between the anticipated steering torque and the actual steering torque, and a deceleration difference between the anticipated deceleration and the actual deceleration.

20 Claims, 7 Drawing Sheets

(51) Int. Cl.
*B60T 8/17* (2006.01)
*B60T 8/172* (2006.01)
*B60T 8/32* (2006.01)
*B60T 8/176* (2006.01)
*B60T 8/58* (2006.01)

(52) U.S. Cl.
CPC ............... *B60T 8/321* (2013.01); *B60T 8/58* (2013.01); *B60T 2220/00* (2013.01); *B60T 2250/00* (2013.01); *B60T 2250/03* (2013.01); *B60T 2270/10* (2013.01)

(58) Field of Classification Search
CPC ............. B60T 2220/00; B60T 2250/00; B60T 2250/03; B60T 2270/10; B60T 8/1755; B60T 13/662; B60T 8/17551; B60T 8/24
USPC ......................................................... 701/72
See application file for complete search history.

(56) References Cited

U.S. PATENT DOCUMENTS

| | | | |
|---|---|---|---|
| 2010/0042305 A1* | 2/2010 | Attallah | B60T 7/22 701/93 |
| 2014/0379246 A1* | 12/2014 | Rose | B60W 50/00 701/123 |
| 2018/0079396 A1* | 3/2018 | Leonard | B60T 15/048 |
| 2018/0201242 A1* | 7/2018 | Bretzigheimer | B60T 8/17557 |
| 2020/0180687 A1* | 6/2020 | Ye | B62D 5/0409 |

* cited by examiner

SYSTEM AND METHOD FOR DYNAMIC BRAKE CALIBRATION

CROSS REFERENCE TO PARENT APPLICATION(S)

This application claims the benefit of U.S. Patent Application Ser. No. 62/839,616, filed on Apr. 27, 2019, entitled "Electro Mechanical Brake: Dynamic Brake Calibration in Electric Mechanical Brake System & Autonomous Park Brake Actuation in Electric Mechanical Brake System During Crash", which is all hereby incorporated herein by reference in its entirety.

BACKGROUND

The present disclosure generally relates to an apparatus and method for controlling a vehicle. More specifically, some embodiments of the present disclosure relate to an apparatus and method for improving vehicle stability by dynamic brake calibration.

An automotive vehicle may include control systems to assist a driver in maintaining the control of the vehicle during various vehicle functions, such as steering and braking, and under varying vehicle driving conditions. These control systems may take into account many factors including vehicle speed, vehicle acceleration, steering angle, wheel slip, and so on. The control systems have evolved through the years and have been improved upon by enhancements such as intervention into the suspension, steering, brakes, or engine management for the vehicle. Such enhancements include, for example, traction slip control to prevent the spinning of the wheels of the vehicle, anti-lock brakes, and electronic stability control. Dynamic control systems for automotive vehicles can be applied to various products.

It is with respect to these and other general considerations that the following embodiments have been described. Also, although relatively specific problems have been discussed, it should be understood that the embodiments should not be limited to solving the specific problems identified in the Background.

SUMMARY

The features and advantages of the present disclosure will be more readily understood and apparent from the following detailed description, which should be read in conjunction with the accompanying drawings, and from the claims which are appended to the end of the detailed description.

Various embodiments of the present disclosure can provide dynamic brake calibration applied to each individual brake assembly to compensate for mismatch of vehicle motions, variations in vehicle loading, mismatch or changes in pad wear and/or operations.

According to some embodiments of the present disclosure, a control system for a vehicle having a plurality of vehicle wheels may comprise: a plurality of brakes, wherein each of the brakes is configured to apply individual braking to a respective one of the vehicle wheels; memory configured to store brake characteristic parameters for controlling each of the brakes; and a processor configured to: calculate anticipated yaw of the vehicle, anticipated steering torque of the vehicle, and anticipated deceleration of the vehicle, which are associated with operation of the brakes; compare between the anticipated yaw and actual yaw of the vehicle, between the anticipated steering torque and actual steering torque of the vehicle, and between the anticipated deceleration and actual deceleration of the vehicle; and calibrate the brakes by adjusting the stored brake characteristic parameters of each of the brakes in response to a yaw difference between the anticipated yaw and the actual yaw of the vehicle, a steering torque difference between the anticipated steering torque and the actual steering torque of the vehicle, and a deceleration difference between the anticipated deceleration and the actual deceleration of the vehicle.

In certain embodiments of the present disclosure, the plurality of brakes may comprise a front left brake and a front right brake, and the processor may configured to adjust the stored brake characteristic parameters of the front left and front right brakes in response to the steering torque difference between the anticipated steering torque and the actual steering torque of the vehicle. For example, the processor is configured to, when detecting the steering torque difference between the anticipated steering torque and the actual steering torque of the vehicle causing the vehicle to pull left, adjust the stored brake characteristic parameters of one or both of the front left brake and the front right brake to decrease braking of the front left brake and/or increase braking of the front right brake. In another example, the processor may be configured to, when detecting the steering torque difference between the anticipated steering torque and the actual steering torque of the vehicle causing the vehicle to pull right, adjust the stored brake characteristic parameters of one or both of the front left brake and the front right brake to increase braking of the front left brake and/or to decrease braking of the front right brake.

In some embodiments of the present disclosure, the plurality of brakes may comprise left side brakes and right side brakes, and the processor may be configured to adjust the stored brake characteristic parameters of the left and right side brakes to balance between the left side brakes and the right side brakes in response to the yaw difference between the anticipated yaw and the actual yaw of the vehicle. For example, the processor is configured to, when detecting the yaw difference between the anticipated yaw and the actual yaw of the vehicle causing to yaw the vehicle left, adjust the stored brake characteristic parameters of one or more of the left and right side brakes to decrease braking of the left side brakes and/or to increase braking of the right side brakes. In another example, the processor is configured to, when detecting the yaw difference between the anticipated yaw and the actual yaw of the vehicle causing to yaw the vehicle right, adjust the stored brake characteristic parameters of one or more of the left and right side brakes to increase braking of the left side brakes and/or to decrease braking of the right side brakes.

In certain embodiments of the present disclosure, the processor may be configured to adjust the stored brake characteristic parameters of all of the brakes in response to the deceleration difference between the anticipated deceleration and the actual deceleration of the vehicle. For example, the processor is configured to, when the actual deceleration of the vehicle is less than the anticipated deceleration of the vehicle, adjust the stored brake characteristic parameters of one or more of the brakes to increase braking of the brakes. In another example, the processor is configured to, when the actual deceleration of the vehicle is greater than the anticipated deceleration of the vehicle, adjust the stored brake characteristic parameters of one or more of the brakes to decrease braking of the brakes.

In some embodiments of the present disclosure, the processor may be configured to, calculate the anticipated yaw of the vehicle, the anticipated steering torque, and the anticipated deceleration of the vehicle after a predetermined time period from initiation of brake operation elapses.

In certain embodiments of the present disclosure, the processor may be configured to check whether the adjusted brake characteristic parameters of each of the brakes are within a preset range.

In certain embodiments of the present disclosure, the plurality of brakes may comprise front brakes and rear brakes, and the processor may be configured to calibrate the front brakes and the rear brakes comprises adjusting the stored brake characteristic parameters of the front brakes and the rear brakes to balance between the front brakes and the rear brakes based on operation of the brakes associated with an anti-lock braking system (ABS).

According to some embodiments of the present disclosure, a computer-implemented method for controlling a vehicle having a plurality of vehicle wheels may comprise: calculating anticipated yaw of the vehicle, anticipated steering torque of the vehicle and anticipated deceleration of the vehicle, which are associated with operation of a plurality of brakes, wherein each of the brakes is configured to apply individual braking to a respective one of the vehicle wheels; comparing between the anticipated yaw and actual yaw of the vehicle, between the anticipated steering torque and actual steering torque of the vehicle, and between the anticipated deceleration and actual deceleration of the vehicle; and calibrating the brakes by adjusting brake characteristic parameters of each of the brakes, stored in memory for controlling each of the brakes, in response to a yaw difference between the anticipated yaw and the actual yaw of the vehicle, a steering torque difference between the anticipated steering torque and the actual steering torque of the vehicle, and a deceleration difference between the anticipated deceleration and the actual deceleration of the vehicle.

In certain embodiments of the present disclosure, the plurality of brakes may comprise a front left brake and a front right brake, and the calibrating the brakes may comprise adjusting the stored brake characteristic parameters of the front left and front right brakes in response to the steering torque difference between the anticipated steering torque and the actual steering torque of the vehicle. For example, the calibrating the brakes may comprise, when detecting the steering torque difference between the anticipated steering torque and the actual steering torque of the vehicle causing the vehicle to pull left, adjusting the stored brake characteristic parameters of one or both of the front left brake and the front right brake to decrease braking of the front left brake and/or increase braking of the front right brake. In another example, the calibrating the brakes may comprise, when detecting the steering torque difference between the anticipated steering torque and the actual steering torque of the vehicle causing the vehicle to pull right, adjusting the stored brake characteristic parameters of one or both of the front left brake and the front right brake to increase braking of the front left brake and/or to decrease braking of the front right brake.

In some embodiments of the present disclosure, the plurality of brakes may comprise left side brakes and right side brakes, and the calibrating the brakes may comprise adjusting the stored brake characteristic parameters of the left and right side brakes to balance between the left side brakes and the right side brakes in response to the yaw difference between the anticipated yaw and the actual yaw of the vehicle. For example, the calibrating the brakes may comprise, when detecting the yaw difference between the anticipated yaw and the actual yaw of the vehicle causing to yaw the vehicle left, adjusting the stored brake characteristic parameters of one or more of the left and right side brakes to decrease braking of the left side brakes and/or to increase braking of the right side brakes. In another example, the calibrating the brakes may comprise, when detecting the yaw difference between the anticipated yaw and the actual yaw of the vehicle causing to yaw the vehicle right, adjusting the stored brake characteristic parameters of one or more of the left and right side brakes to increase braking of the left side brakes and/or to decrease braking of the right side brakes.

In certain embodiments of the present disclosure, the calibrating of the brakes may comprise adjusting the stored brake characteristic parameters of all of the brakes in response to the deceleration difference between the anticipated deceleration and the actual deceleration of the vehicle. For example, the calibrating the brakes may comprise, when the actual deceleration of the vehicle is less than the anticipated deceleration of the vehicle, adjusting the stored brake characteristic parameters of one or more of the brakes to increase braking of the brakes. In another example, the calibrating the brakes may comprise, when the actual deceleration of the vehicle is greater than the anticipated deceleration of the vehicle, adjusting the stored brake characteristic parameters of one or more of the brakes to decrease braking of the brakes.

In some embodiments of the present disclosure, the anticipated yaw of the vehicle, the anticipated steering torque, and the anticipated deceleration of the vehicle may be calculated after a predetermined time period from initiation of brake operation elapses.

In certain embodiments of the present disclosure, the method may further comprise checking whether the adjusted brake characteristic parameters of each of the brakes are within a preset range.

In certain embodiments of the present disclosure, the plurality of brakes may comprise front brakes and rear brakes, and the method may further comprise calibrating of the front brakes and the rear brakes to the calibrating the brakes comprises adjusting the stored brake characteristic parameters of the front brakes and the rear brakes to balance between the front brakes and the rear brakes based on operation of the brakes associated with an anti-lock braking system (ABS).

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part of the present disclosure, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1:
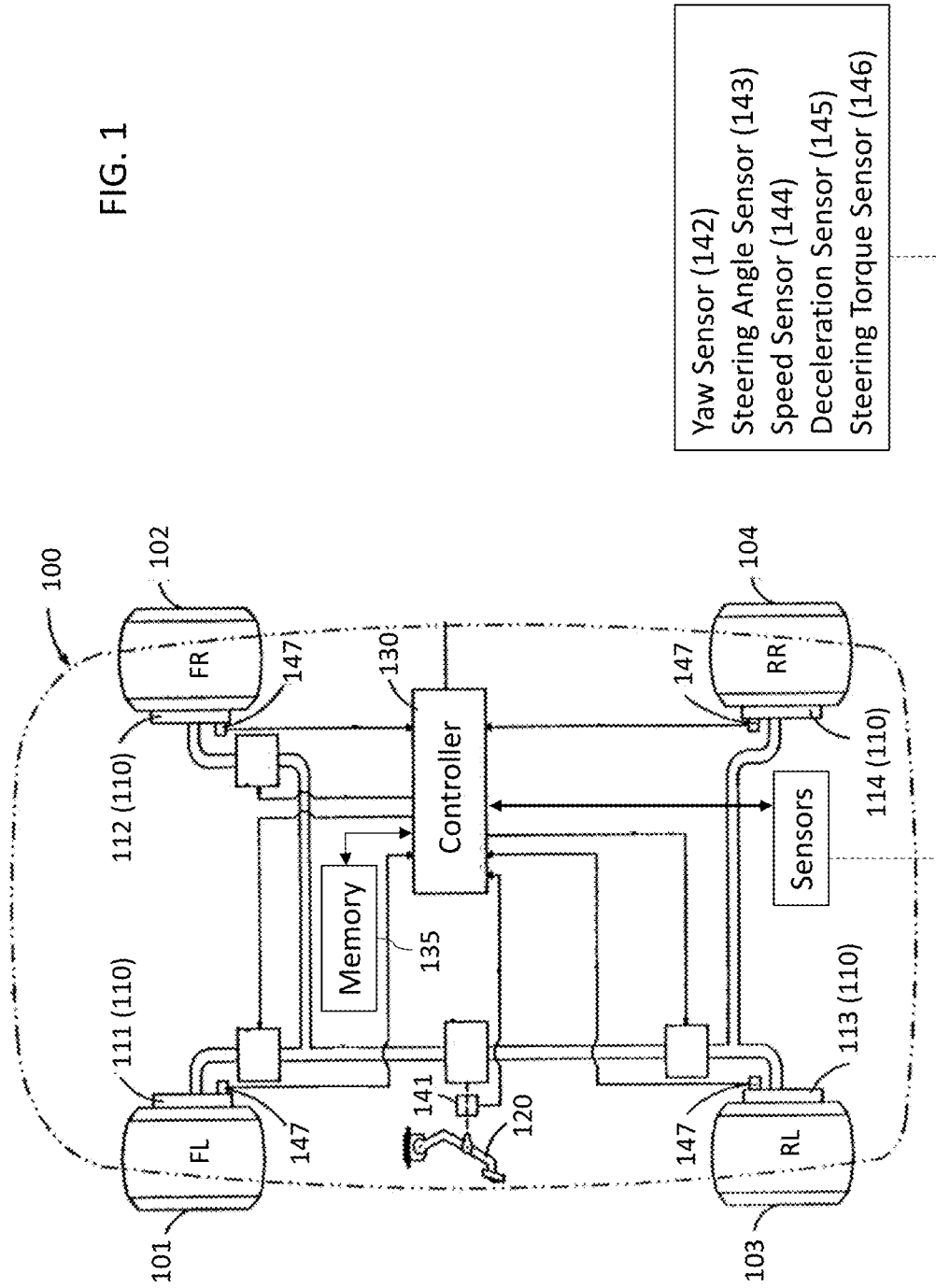
FIG. 1 is a schematic view of a vehicle including a vehicle control system according to an embodiment of the present disclosure.

FIG. 1 is a schematic view of a vehicle including a vehicle control system according to an embodiment of the present disclosure.

Referring to FIG. 1, a vehicle 100 may comprise a plurality of vehicle wheels. For example, the wheels of the vehicle 100 may include a front left (FL) wheel 101, a front right (FR) wheel 102, a rear left (RL) wheel 103, and a rear right (RR) wheel 104. Brake assemblies 110 may include a plurality of brakes 111, 112, 113, 114 which are operably coupled to each of four vehicle wheels 101, 102, 103, 104. Each of the brakes 111, 112, 113, 114 may be configured to apply an individual brake force to a respective one of the vehicle wheels 101, 102, 103, 104. For example, the braking can be achieved by forcing the brake pad of the brake to the disc of the vehicle wheel. The brakes 111, 112, 113, 114 may be independently actuatable through a controller 130.

Operation of the brake assemblies 110 may involve a vehicle operator depressing a driver-manipulated brake pedal 120 which is sensed by a brake pedal sensor 141. The brake pedal sensor 141 monitors the position, movement exerted force, and/or state of the brake pedal 120 and provides the controller 130 with an input signal that is representative of the requested brake torque (also known as a driver braking intent).

Additionally, the controller 130 may control the brake assemblies 110 according to control algorithm, software, or instructions stored in memory, for example, but not limited to, self-driving software, Advanced Driver-Assistance Systems (ADAS), traction slip control, anti-lock brake control, electronic stability control and any other algorithm or computer-implemented system for controlling a vehicle automatically or assisting a vehicle operator.

Various sensors may be associated with the controller 130 and may be used alone or in various combinations depending on the conditions. Other sensors may be used to complement or verify determinations of other sensors. For example, some sensors may be used to check the image or radar signals, or vice versa.

For example, a yaw sensor 142 may be configured to measure a yaw (or rotation) motion of the vehicle 100. The yaw motion may comprise a yaw or rotation angle, a yaw rate, a yaw torque or any indicative of yaw. The yaw sensor 142 may determine the orientation of the vehicle 100 with respect to the direction of travel of the vehicle 100. However, without the yaw sensor 142, the controller 130 can calculate the yaw of the vehicle 100 based on signals from other sensors. For example, the yaw of the vehicle 100 can be calculated using one or more of an individual wheel speed signal from each of wheel speed sensors 147, a vehicle speed from a vehicle speed sensor 144, longitudinal acceleration, lateral acceleration, steering angle, and/or calculated derivatives of these.

A steering angle sensor 143 may be configured to measure a steering angle of a steering wheel manipulated by the driver or a physical quantity relating thereto, and generate a signal that is proportional to the steering angle.

The speed sensor 144 can configured to sense a speed of the vehicle 100. A deceleration sensor 145 may be configured to sense the deceleration of the vehicle 100. However, without the speed sensor 144 and the deceleration sensor 145, the controller 130 can calculate the speed and acceleration of the vehicle 100 based on signals from other sensors. For instance, the controller 130 receives an individual wheel speed signal (or an individual wheel acceleration signal) from each of the wheel speed sensors 147, and calculates the vehicle speed (or the acceleration) from the average of the values received.

A steering torque sensor 146 may be configured to sense the steering torque of the front wheels 101, 102. However, without the steering torque sensor 146, the controller 130 can calculate the steering torque of the front wheels 101, 102 based on signals from other sensors.

The wheel speed sensors 147 are associated with the individual wheels 111, 112, 113, 114, respectively. The wheel speed sensors 147 provide the controller 130 with a signal that includes an indication of the individual wheel speed for each of the wheels 101, 102, 103, 104, respectively.

The vehicle sensors may include any combination of components, devices, modules, systems, and so on that measure wheel speed, wheel acceleration, vehicle speed, vehicle acceleration, frictional brake torque, regenerative brake torque, tire pressure, vehicle mass, yaw, yaw rate, steering angle, road grade, whether conditions, or any other vehicle operating parameters that can be used to control the vehicle 100. One or more of the vehicle sensors may be embodied in hardware, software, firmware, or some combination thereof, and may be electronically coupled to the controller 130 via an electronic connection, via other electronic components such as other devices, modules, and systems, via a vehicle communications bus or network, or via some other communication.

The controller 130 may be programmed to perform various functions and control various outputs in response to information received from a number of sensors. The controller 130 is electrically connected to various elements of the vehicle 100, for example, but not limited to, the brake assemblies 110 including the brakes 111, 112, 113, 114, various sensors and memory 135. The controller 130 is configured to receive various input signals, for example, but not limited to, signals from a plurality of sensors installed in the vehicle 100. During the brake operation of the brake assembly 110, the controller 130 may continuously receive signals from the sensors, or may receive telemetry information from the sensors after the braking event occurs. The controller 130 is configured to output control signals to the brake assemblies 110 to control the brakes 111, 112, 113, 114.

The controller 130 may be, for example, but not limited to, a device, using mechanical, hydraulic, pneumatic electronic techniques, and/or a microprocessor or computer, which monitors and physically alters the operating conditions of a given dynamical system. In one example, the controller 130 can include an Allen Bradley brand Programmable Logic Controller (PLC). The controller 130 may include one or more processors (for example, 520 of FIG. 5) for performing calculations to process input or output. The controller 130 may include a memory (for example, 540 of FIG. 5) for storing values to be processed by the processor, or for storing the results of previous processing. The controller 130 may also be configured to accept input and output from a wide array of input and output devices for receiving or sending values. Such devices include other computers, keyboards, mice, visual displays, printers, industrial equipment, and systems or machinery of all types and sizes. For example, the controller 130 can control a network or network interface to perform various network communications upon request. The network interface may be part of the controller 130, or characterized as separate and remote from the controller 130. The controller 130 may be a single, physical, computing device having similar functions with a desktop computer, or a laptop computer, or may be composed of multiple devices of the same type such as a group of servers operating as one device in a networked cluster, or a heterogeneous combination of different computing devices operating as one controller and linked together by a communication network. The communication network connected to the controller 130 may also be connected to a wider network such as the Internet. Thus, the controller 130 may include one or more physical processors or other computing devices or circuitry, and may also include any suitable type of memory. The controller 130 may also be a virtual computing platform having an unknown or fluctuating number of physical processors and memories or memory devices. The controller 130 may thus be physically located in one geographical location or physically spread across several widely scattered locations with multiple processors linked together by a communication network to operate as a single controller. Multiple controllers or computing devices may be configured to communicate with one another or with other devices over wired or wireless communication links to form a network. Network communications may pass through various controllers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using WiFi or other Wireless Local Area Network (WLAN) or a cellular transmitter/receiver to transfer data.

Figure 5:
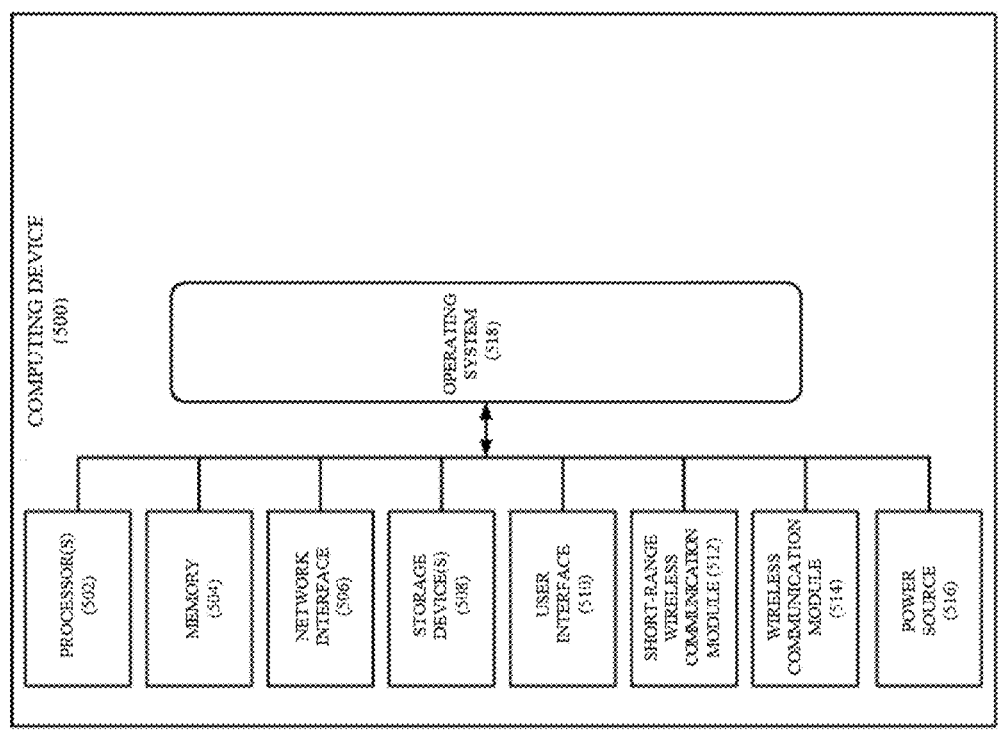
FIG. 5 shows a block diagram of a computing device according to an embodiment of the present disclosure.

The memory 135 store characteristic data, information, values (parameters, curves, maps, patterns, tables and/or thresholds), for example, brake characteristic parameters for controlling each of the brakes 111, 112, 113, 114. The brake characteristic parameters may include parameters related to brake force and/or the time of braking for controlling each of the brakes 111, 112, 113, 114. For instance, initial parameters are decided on the bases of results of having tested various parameters in a hypothetical test environment and stored in the memory 135. The controller 130 can change the initial parameters by calibration operations. The memory 135 may be a stand-alone memory associated with the controller 130 as shown in FIG. 1 or may be incorporated within the controller 130 as shown in FIG. 5.

Figure 2:
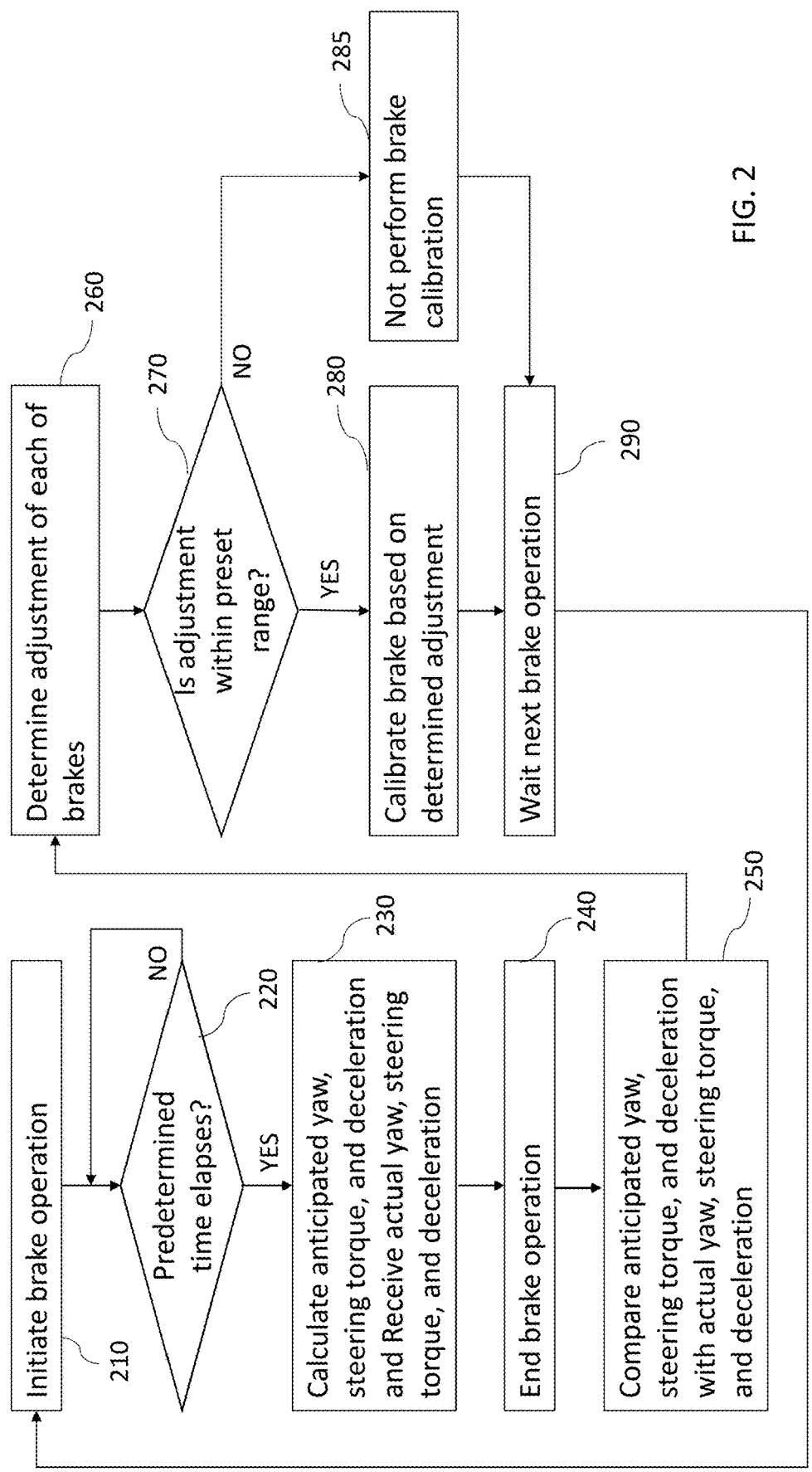
FIG. 2 is a flow diagram illustrating a method for calibrating brakes of a vehicle according to an embodiment of the present disclosure.

FIG. 2 is a flow diagram illustrating a method for calibrating brakes of a vehicle according to an embodiment of the present disclosure.

A brake operation may be initiated (step 210). The brake operation may mean operation associated with the brake assemblies 110 that one or more of the brakes 111, 112, 113, 114 apply brake force to one or more of the vehicle wheels 101, 102, 103, 104. For example, the controller 130 may initiate the brake operation by providing command signals to each of the brakes 111, 112, 113, 114 in response to the input signal received from the brake pedal sensor 141. The command signals transmitted to each of the brakes 111, 112, 113, 114 can be different from each other. The controller 130 may use a variety of different signal processing techniques to filter, convert, evaluate, analyze and/or otherwise process the input signals from the sensors and to discern the requested brake operation. Other techniques and methods can be used for the brake operation instead. In another example, without the input signal received from the brake pedal sensor 141 or regardless of the driver's intent, the controller 130 may initiate the brake operation according to algorithms or software instructions for controlling the vehicle 100 and/or the brake assemblies 110.

After a predetermined time period from the initiation of the brake operation elapses (step 220), the controller 130 calculates anticipated yaw, anticipated steering torque, and anticipated deceleration of the vehicle 100, and receives current measures of actual yaw, actual steering torque, and actual deceleration of the vehicle 100 (step 230) until the brake operation is ended (Step 240). The end of the brake operation may mean, for example, but not limited to, brake release that one or more of the brakes 111, 112, 113, 114 applying the brake force to one or more of the vehicle wheels 101, 102, 103, 104 are released that the brake pedal sensor 141 senses the release of the brake pedal 141. However, step 220 may be an optional step and be omitted. For instance, the controller 130 may calculate anticipated yaw, anticipated steering torque, and anticipated deceleration of the vehicle 100, and receives current measures of actual yaw, actual steering torque, and actual deceleration of the vehicle 100 (step 230) from the initiation of the brake operation (step 210) to the end of the brake operation (step 240). The actual yaw, actual steering torque, and actual deceleration may be only collected during braking operation when the pedal 120 is depressed, and may not be collected upon release of the pedal 120.

In an exemplary embodiment, the anticipated yaw, steering torque and deceleration of the vehicle 100 may be average values of the yaws, steering torques and decelerations which are calculated in step 230 during a time period after the predetermined time period of step 220 elapses until the brake operation is ended at step 240. Likewise, the actual yaw, steering torque and deceleration of the vehicle 100 may be average of the actual values of the yaws, steering torques and decelerations during a time period after the predetermined time period of step 220 elapses until the brake operation is ended (step 240). In another exemplary embodiment, the anticipated yaw, steering torque and deceleration of the vehicle 100 may be values of yaw, steering torque and deceleration which are calculated at a specific predetermined time point between the initiation of the brake operation and the end of the brake operation. Likewise, the actual yaw, steering torque and deceleration of the vehicle 100 may be values of actual yaw, actual steering torque and deceleration at a specific predetermined time point between the initiation of the brake operation and the end of the brake operation. However, the controller 130 can use any appropriate values that can represent anticipated yaw, steering torque and deceleration of the vehicle 100 and the actual yaw, steering torque and deceleration of the vehicle 100 during the brake operation or application.

The controller 130 compares between the anticipated yaw and the actual yaw of the vehicle 100, between the anticipated steering torque and the actual steering torque of the vehicle 100, and between the anticipated deceleration and the actual deceleration of the vehicle 100 (step 250), and determines adjustment of individual braking of each of the brakes 111, 112, 113, 114 in response to the comparison result of step 250 (step 260). In some embodiments, Steps 250 and/or 260 can be performed before the end of the brake operation (step 240). Alternatively, steps 250 and/or 260 can be performed after the end of the brake operation step 240.

Figure 3:
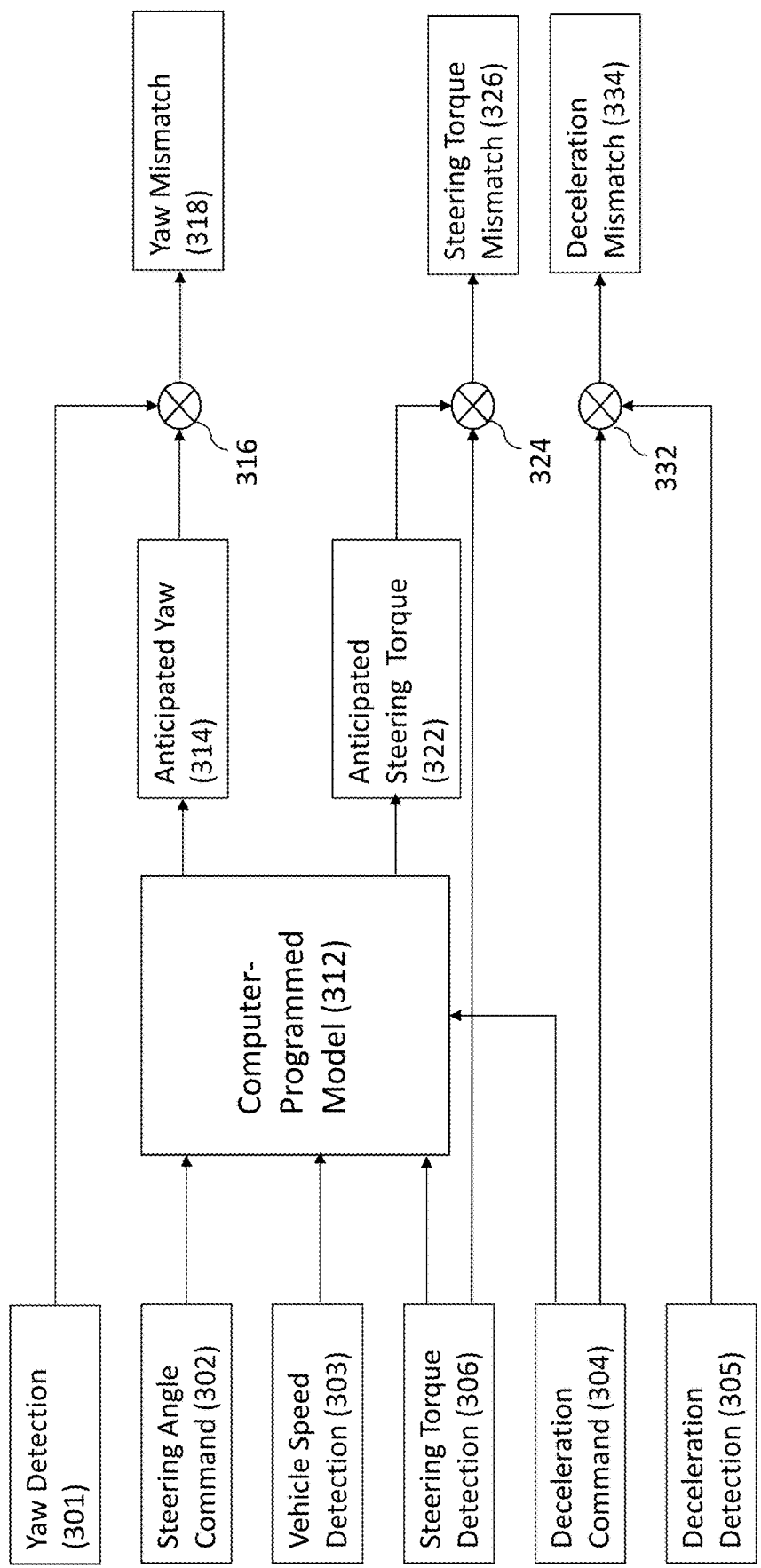
FIG. 3 is a flow diagram showing a method for calculating yaw, deceleration and steering torque mismatches according an embodiment of the present disclosure.

FIG. 3 is a conceptual block diagram showing an exemplary embodiment of Steps 230 and 250 of FIG. 2.

The anticipated yaw 314 may be calculated using a computer-programmed model 312, for example, but not limited to, a vehicle dynamics model. The vehicle dynamic model may be a mathematical model that considers vehicle dynamics along with measurements supplied by sensors recording vehicle speed, yaw rate, and actions of the driver of the vehicle, such as the steering wheel and the application of the brakes and accelerator. The vehicle dynamics models can be obtained in advance by experiment, simulation or the like, and be implemented as algorithms or software instructions. The controller 130 calculates the anticipated yaw 314 by applying one or more of a commanded steering angle 302, a detected vehicle speed 303, a commanded deceleration 304, a detected deceleration 305, and a detected steering torque 306 to the computer-programmed model 312. For example, the controller 130 may receive the commanded steering angle 302 from the steering angle sensor 143, the detected vehicle speed 303 from the speed sensor 144, the commanded deceleration 304 from the brake pedal sensor 141, the detected deceleration 305 from the deceleration sensor 145, the detected steering torque 306 from the steering torque sensor 146. Alternatively, the controller 130 may calculate one or more of the commanded steering angle 302, the detected vehicle speed 303, the commanded deceleration 304, the detected deceleration 305, the detected steering torque 306 using signals from other sensors, information from the Global Positioning System (GPS), images captured by a camera, and any information, data and signal related to the operation of the vehicle 100.

At 316, the controller 130 subtracts the detected actual yaw 301 from the anticipated yaw 314. In some embodiments, the actual yaw 301 can be measured by the yaw sensor 142 of FIG. 1. Alternatively, the actual yaw 301 of the vehicle 100 can be calculated based on signals from other sensors. For example, the actual yaw 301 of the vehicle 100 can be calculated using an individual wheel speed signal from each of wheel speed sensors 147, a vehicle speed from the vehicle speed sensor 144, longitudinal acceleration, lateral acceleration, steering angle, and calculated derivatives of these.

At 318, the controller 130 may detect yaw mismatch of the vehicle 100 between the detected actual yaw 301 and the anticipated yaw 314 based on the subtract result of 316. When there is the mismatch between the actual yaw 301 and the anticipated yaw 314 of the vehicle 100, the vehicle 100 may be subjected to yaw moment, and this yaw moment may pull the vehicle to one direction (e.g., to a left side or a right side) requiring steering correction to maintain the desired path. Excessive yaw may compromise vehicle stability. Counter measures such as steering can mitigate excessive yaw in all but the most extreme driving situations. For example, in extreme conditions, the vehicle may spin out unless the vehicle operator is able to counter the brake force imbalance by steering quickly in an opposing direction.

The controller 130 may generate one or more calibration adjustment command signals to balance between the left side brakes 111, 113 and the right side brakes 112, 114 in response to the detection of the yaw mismatch. The calibration adjustment command signals may update brake characteristic parameters of the left side brakes 111, 113 and the right side brakes 112, 114 stored in the memory 135. For example, when detecting the yaw mismatch causing to yaw the vehicle 100 left, the controller 130 may generate the calibration adjustment command signals adjusting the stored brake characteristic parameters of one or more of the left side brakes 111 and/or 113 and right side brakes 112 and/or 114 to decrease braking of the left side brakes 111 and/or 113 and/or to increase braking of the right side brakes 112 and/or 114 so that the net braking to the right side can be increased. When detecting the yaw mismatch causing to yaw the vehicle 100 right, the controller 130 may generate the calibration adjustment command signals adjusting the stored brake characteristic parameters of one or more of the left side brakes 111 and/or 113 and right side brakes 112 and/or 114 to increase braking of the left side brakes 111 and/or 113 and/or to decrease braking of the right side brakes 112 and/or 114 so that the net braking to the left side can be increased.

The anticipated steering torque 322 may be calculated using the computer-programmed model 312, for example, but not limited to, the vehicle dynamics model. The controller 130 calculates the anticipated steering torque 322 by applying one or more of the commanded steering angle 302, the detected vehicle speed 303, the commanded deceleration 304, the detected deceleration 305, and the detected steering torque to the computer-programmed model 312.

At 324, the controller 130 subtracts the actual steering torque 306 from the anticipated steering torque 322. In some embodiments, the actual steering torque 322 can be measured by the steering toque sensor 146 of FIG. 1. Alternatively, the actual steering torque 322 of the vehicle 100 can be calculated based on signals from other sensors.

The steering torque may be the unintended influence of engine torque on the steering, especially in front wheels 101, 102. For example, during heavy acceleration, the steering may pull to one side, which may be disturbing to a driver. The effect is manifested either as a tugging sensation in the steering wheel, or a veering of the vehicle from the intended path. The steering torque may be directly related to differences in the forces in the contact patches of the left and right wheels. The effect may become more evident when high torques are applied to the vehicle wheels either because of a high overall reduction ratio between the engine and wheels, high engine torque, or some combination of the two.

At 326, the controller 130 may detect the steering torque mismatch of the vehicle 100 between the detected actual steering torque 306 and the anticipated steering torque 322 based on the subtract result of 324.

The controller 130 may generate one or more calibration adjustment command signals to adjust braking of one or both of the FL brake 111 and the FR brake 112 in response to the detection of the steering torque mismatch. The calibration adjustment command signals may update or change the brake characteristic parameters of the FL brake 111 and the FR brake 112. For example, when detecting the steering torque mismatch causing the vehicle 100 to pull left, the controller 130 may generate the calibration adjustment command signals adjusting the stored brake characteristic parameters of one or more of the FL brake 111 and the FR brake 112 to decrease braking of the FL brake 111 and/or to increase braking of the FR brake 112. When detecting the steering torque mismatch causing the vehicle 100 to pull right, the controller 130 may generate the calibration adjustment command signals adjusting the stored brake characteristic parameters of one or more of the FL brake and the FR brake 112 to increase braking of the FL brake 111 and/or to decrease braking of the FR brake 112.

The anticipated deceleration of the vehicle 100 may be the commanded deceleration 304. The commended deceleration 304 may be a signal of commanding deceleration generated by the controller 300. Alternatively, the commanded deceleration 304 can be calculated based on a signal generated from the brake pedal sensor 141.

The actual deceleration 305 of the vehicle 100 can be detected by the deceleration sensor 145 of FIG. 1. Alternatively, the actual deceleration 305 of the vehicle 100 can be calculated based on signals from other sensors. For instance, the accelerometer 145 may be omitted and the actual deceleration 305 can be calculated based on the wheel speeds sensed by the wheel speed sensors 147.

At 332, the controller 130 subtracts the actual deceleration 305 from the commanded deceleration 304. At 334, the controller 130 may detect the deceleration mismatch of the vehicle 100 between the actual deceleration 305 and the commanded deceleration 304 based on the subtract result of 332.

The controller 130 may generate one or more calibration adjustment command signals to adjust braking of one or more of the brakes 111, 112, 113, 114 in response to the detection of the deceleration mismatch. The calibration adjustment command signals may update or change brake characteristic parameters of the brakes 111, 112, 113, 114. For example, when the actual deceleration of the vehicle 100 is less than the anticipated deceleration of the vehicle 100 during the brake operation, the controller 130 may generate the calibration adjustment command signals adjusting the stored brake characteristic parameters of one or more of the brakes 111, 112, 113, 114 to increase the braking of the brakes 111, 112, 113, 114. When the actual deceleration of the vehicle 100 is greater than the anticipated deceleration of the vehicle 100 during the brake operation, the controller 130 may generate the calibration adjustment command signals adjusting the stored brake characteristic parameters of one or more of the brakes 111, 112, 113, 114 to decrease the braking of the brakes 111, 112, 113, 114.

Figure 4A:
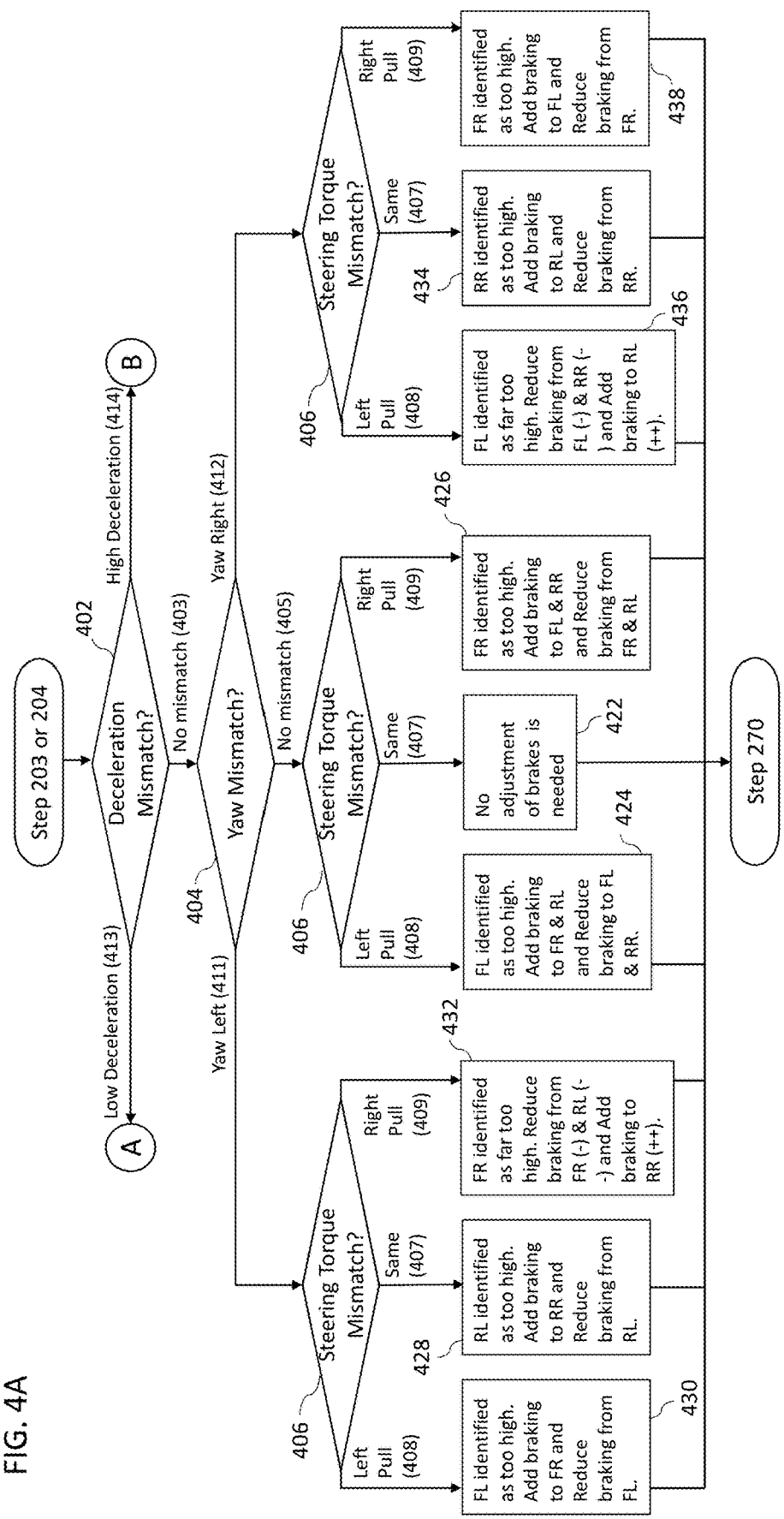
FIGS. 4A-4C are a flow diagram showing a method for determining adjustments of braking of each brake according an embodiment of the present disclosure.
Figure 4B:
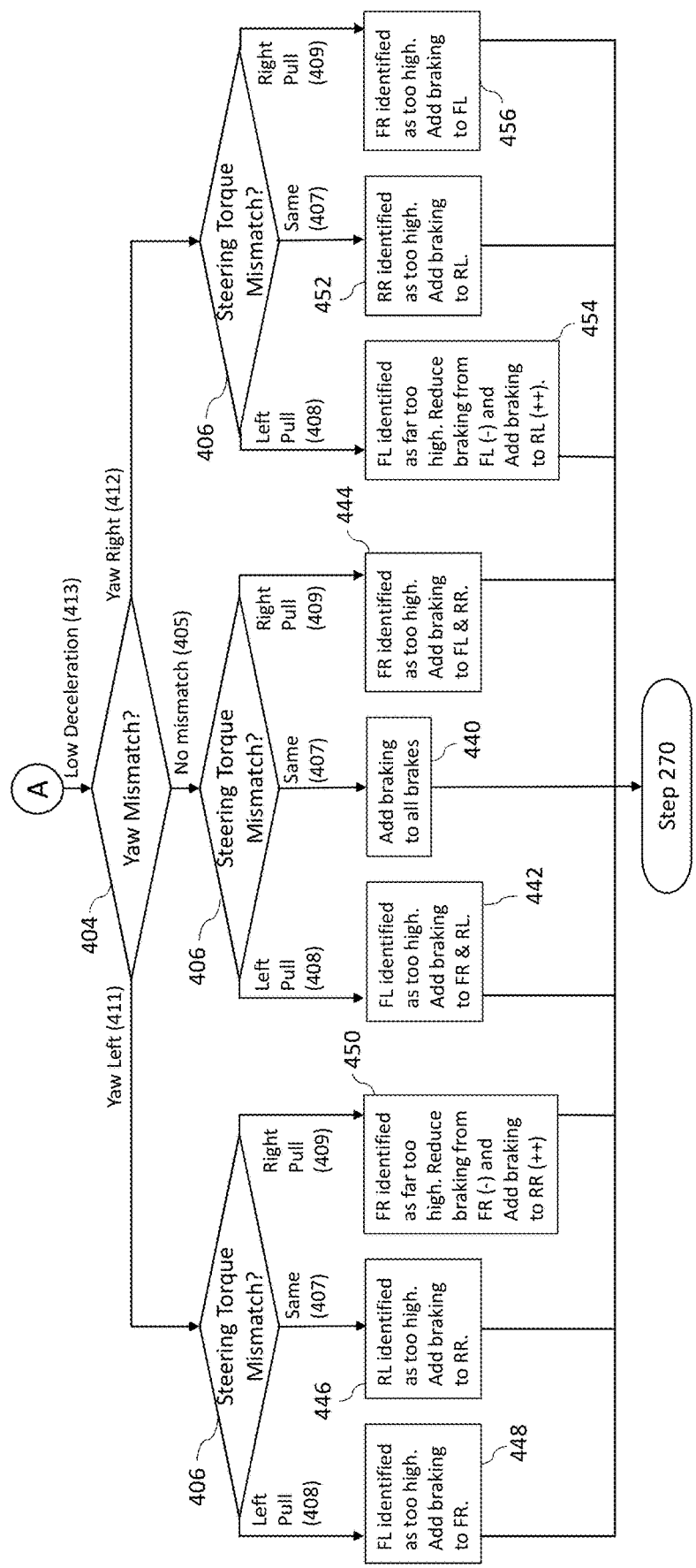
Figure 4C:
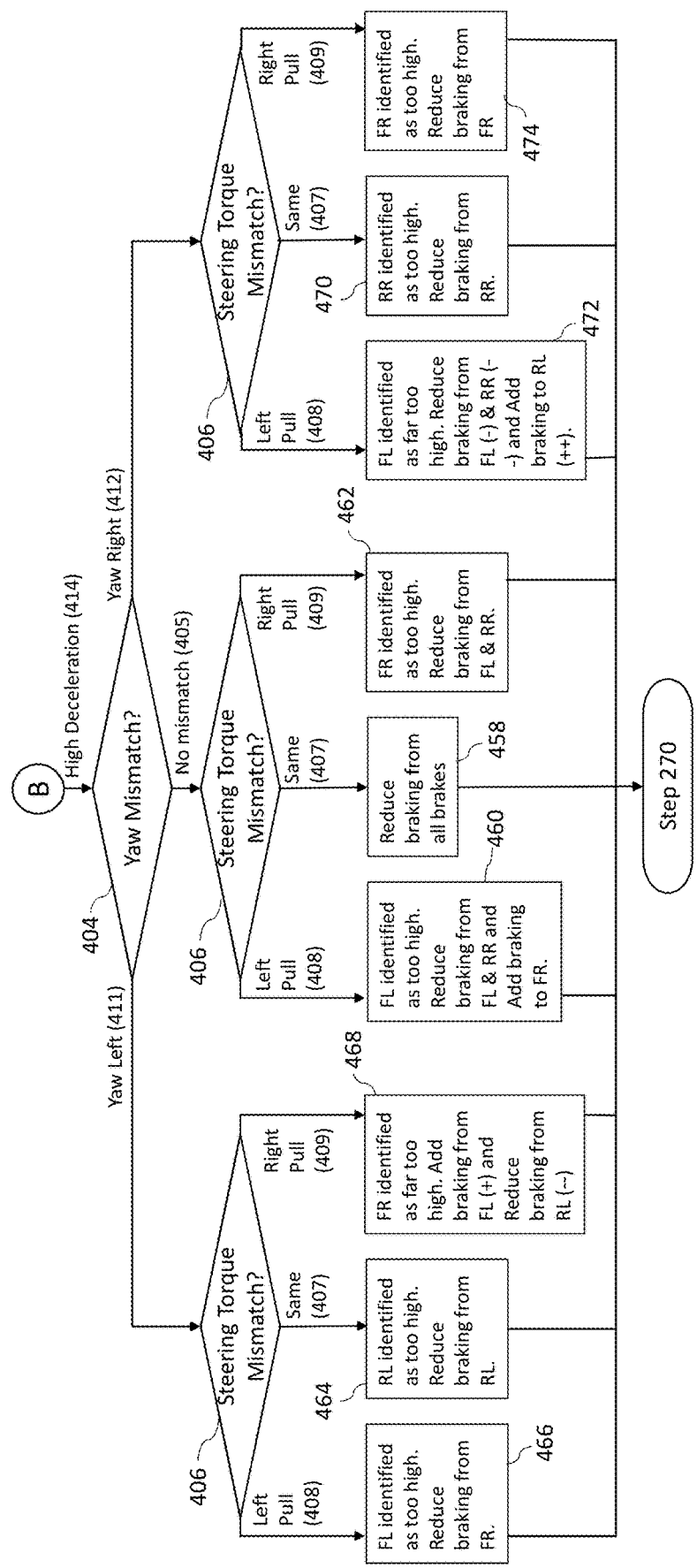

FIGS. 4A-4C are flow charts illustrating an exemplary embodiment of Steps 250 and 260 of FIG. 2.

The controller 130 compares the actual deceleration of the vehicle 100 with the anticipated deceleration of the vehicle 100 calculated at step 230 of FIG. 2 (step 402). The controller 130 compares the actual yaw of the vehicle 100 with the anticipated yaw of the vehicle 100 calculated at step 230 of FIG. 2 (step 404). The controller 130 compares the actual steering torque of the vehicle 100 with the anticipated steering torque of the vehicle 100 calculated at step 230 of FIG. 2 (step 406). Alternatively, the order of steps 402-406 can be changed or steps 402-406 can be performed simultaneously.

When the controller 130 detects no mismatch of yaw, steering torque and deceleration in steps 402-406 or when the differences between the actual deceleration, yaw and steering torque of the vehicle 100 and the anticipated deceleration, yaw and steering torque of the vehicle 100 are within a preset allowable error range, the controller 130 determines that no adjustment of the brakes 111, 112, 113, 114 is needed (step 422).

When the controller 130 detects the steering torque mismatch causing the vehicle 100 to pull left (408) at step 406 and detects no deceleration mismatch and no yaw mismatch at steps 402 and 404, the controller 130 identifies the brake force of the FL brake 111 as too high, and determines that the calibration of the FL, FR, RL, RR brakes 111, 112, 113, 114 is needed to increase the braking of the FR and RL brakes 112, 113 from the current setting of the FR and RL brakes 112, 113 and to decrease the braking of the FL and RR brakes 111, 114 from the current setting of the FL and RR brakes 111, 114 (step 424). The current setting of the brakes may be stored as the brake characteristic parameters in the memory 135. When the controller detects the steering torque mismatch causing the vehicle 100 to pull right (409) at step 406 and detects no deceleration mismatch and no yaw mismatch at steps 402 and 404, the controller 130 identifies the brake force of the FR brake 112 as too high, and determines that the calibration of the FL, FR, RL, RR brakes 111, 112, 113, 114 is needed to decrease the braking of the FR and RL brakes 112, 113 from the current setting of the FR and RL brakes 112, 113 and to increase the braking force of the FL and RR brakes 111, 114 from the current setting of the FL and RR brakes 111, 114 (step 426).

When the controller 130 detects the yaw mismatch causing to yaw the vehicle 100 left (411) at step 404 and detects no deceleration mismatch and no steering torque mismatch at steps 402 and 406, the controller 130 identifies the brake force of the RL brake 113 as too high, and determines that the calibration of the RL and RR brakes 113, 114 is needed to increase the braking of the RR brake 114 from the current setting of the RR brake 114 and to decrease the braking of the RL brake 113 from the current setting of the RL brake 113 (step 428). When the controller 130 detects the yaw mismatch causing to yaw the vehicle 100 left (411) at step 404 and the steering torque mismatch causing the vehicle 100 to pull left (408) at step 406 and detects no deceleration mismatch at step 402, the controller 130 identifies the brake force of the FL brake 101 as too high, and determines that the calibration of the FL and FR brakes 111, 112 is needed to increase the braking of the FR brake 112 from the current setting of the FR brake 112 and to decrease the braking of the FL brake 111 from the current setting of the FL brake 111 (step 430). When the controller 130 detects the yaw mismatch causing to yaw the vehicle 100 left (411) at step 404 and the steering torque mismatch causing the vehicle 100 to pull right (409) at step 406 and detects no deceleration mismatch at step 402, the controller 130 identifies the brake force of the FR brake 112 as far too high, and determines that the calibration of the FR, RL and RR brakes 112, 113, 114 is needed to decrease one increment of the braking of the FR brake 112 from the current setting of the FR brake 112, increase two increments of the braking of the RR brake 114 from the current setting of the RR brake 114, and decrease two increments of the braking of the RL brake 113 from the current setting of the RL brake 113 (step 432).

When the controller 130 detects the yaw mismatch causing to yaw the vehicle 100 right (412) at step 404 and detects no deceleration mismatch and no steering torque mismatch at steps 402 and 406, the controller 130 identifies the brake force of the RR brake 114 as too high, and determines that the calibration of the RL and RR brakes 113, 114 is needed to increase the braking of the RL brake 113 from the current setting of the RL brake 113 and to decrease the braking of the RR brake 114 from the current setting of the RR brake 114 (step 434). When the controller 130 detects the yaw mismatch causing to yaw the vehicle 100 right (412) at step 404 and the steering torque mismatch causing the vehicle 100 to pull left (408) at step 406 and detects no deceleration mismatch at step 402, the controller 130 identifies the brake force of the FL brake 101 as far too high, and determines that the calibration of the FL, RL and RR brakes 111, 113, 114 is needed to decrease one increment of the braking of the FL brake 111 from the current setting of the FL brake 111, increase two increments of the braking of the RL brake 113 from the current setting of the RL brake 113, and decrease one increment of the braking of the RR brake 114 from the current setting of the RR brake 114 (step 436). When the controller 130 detects the yaw mismatch causing to yaw the vehicle 100 right (412) at step 404 and the steering torque mismatch causing the vehicle 100 to pull right (409) at step 406 and detects no deceleration mismatch at step 402, the controller 130 identifies the brake force of the FR brake 112 as too high, and determines that the calibration of the FL and FR brakes 111, 112 is needed to increase the braking of the FL brake 111 from the current setting of the FL brake 111 and to decrease the braking of the FR brake 112 from the current setting of the FR brake 112 (step 438).

When the controller 130 detects that the actual deceleration of the vehicle 100 is less than the anticipated deceleration during the brake operation (413) at step 402, and detects no yaw mismatch and no steering torque in steps 404 and 406, the controller 130 determines that the calibration of the brakes 111-114 is needed to increase braking of all of the brakes 111-114 equally from the current setting of the brakes 111-114 (step 440).

When the controller 130 detects that the actual deceleration of the vehicle 100 is less than the anticipated deceleration during the brake operation (413) at step 402, and detects the steering torque mismatch causing the vehicle 100 to pull left (408) at step 406 and detects no yaw mismatch at step 404, the controller 130 identifies the brake force of the FL brake 111 as too high, and determines that the calibration of the FR and RL brakes 112, 113 is needed to increase the braking of the FR and RL brakes 112, 113 from the current setting of the FR and RL brakes 112, 113 (step 442). When the controller 130 detects that the actual deceleration of the vehicle 100 is less than the anticipated deceleration during the brake operation (413) at step 402, and detects the steering torque mismatch causing the vehicle 100 to pull right (409) at step 406 and detects no yaw mismatch at step 404, the controller 130 identifies the brake force of the FR brake 112 as too high, and determines that the calibration of the FL and RR brakes 111, 114 is needed to increase the braking of the FL and RR brakes 111, 114 from the current setting of the FL and RR brakes 111, 114 (step 444).

When the controller 130 detects that the actual deceleration of the vehicle 100 is less than the anticipated deceleration during the brake operation (413) at step 402, detects the yaw mismatch causing to yaw the vehicle 100 left (411) at step 404 and detects no steering torque mismatch at step 406, the controller 130 identifies the brake force of the RL brake 113 as too high, and determines that the calibration of the RR brakes 114 is needed to increase the braking of the RR brakes 114 from the current setting of the RR brakes 114 (step 446). When the controller 130 detects that the actual deceleration of the vehicle 100 is less than the anticipated deceleration during the brake operation (413) at step 402, and detects the yaw mismatch causing to yaw the vehicle 100 left (411) at step 404 and the steering torque mismatch causing the vehicle 100 to pull left (408) at step 406, the controller 130 identifies the brake force of the FL brake 111 as too high, and determines that the calibration of the FR brakes 112 is needed to increase the braking of the FR brakes 112 from the current setting of the FR brakes 112 (step 448). When the controller 130 detects that the actual deceleration of the vehicle 100 is less than the anticipated deceleration during the brake operation (413) at step 402, and detects the yaw mismatch causing to yaw the vehicle 100 left (411) at step 404 and the steering torque mismatch causing the vehicle 100 to pull right (409) at step 406, the controller 130 identifies the brake force of the FR brake 112 as too high, and determines that the calibration of the FR, RL and RR brakes 112, 113, 114 is needed to decrease one increment of the braking of the FR brake 112 from the current setting of the FR brake 112 and increase two increments of the braking of the RR brake 114 from the current setting of the RR brake 114 (step 450).

When the controller 130 detects that the actual deceleration of the vehicle 100 is less than the anticipated deceleration during the brake operation (413) at step 402, detects the yaw mismatch causing to yaw the vehicle 100 right (412) at step 404 and detects no steering torque mismatch at step 406, the controller 130 identifies the brake force of the RR brake 114 as too high, and determines that the calibration of the RL brake 113 is needed to increase the braking of the RL brake 114 from the current setting of the RL brake 113 (step 452). When the controller 130 detects that the actual deceleration of the vehicle 100 is less than the anticipated deceleration during the brake operation (413) at step 402, and detects the yaw mismatch causing to yaw the vehicle 100 right (412) at step 404 and the steering torque mismatch causing the vehicle 100 to pull left (408) at step 406, the controller 130 identifies the brake force of the FL brake 111 as far too high, and determines that the calibration of the FL and RL brakes 111, 113 is needed to decrease one increment of the braking of the FL brake 111 from the current setting of the FL brake 111 and increase two increments of the braking of the RL brake 113 from the current setting of the RL brake 113 (step 454). When the controller 130 detects that the actual deceleration of the vehicle 100 is less than the anticipated deceleration during the brake operation (413) at step 402, and detects the yaw mismatch causing to yaw the vehicle 100 right (412) at step 404 and the steering torque mismatch causing the vehicle 100 to pull right (409) at step 406, the controller 130 identifies the brake force of the FR brake 112 as too high, and determines that the calibration of the FL brakes 111 is needed to increase the braking of the FL brake 111 from the current setting of the FL brake 111 (step 456).

When the controller 130 detects that the actual deceleration of the vehicle 100 is greater than the anticipated deceleration during the brake operation (414) at step 402, and detects no yaw mismatch and no steering torque mismatch in steps 404 and 406, the controller 130 determines that the calibration of the brakes 111-114 is needed to decrease braking of all of the brakes 111-114 equally from the current setting of the brakes 111-114 (step 458).

When the controller 130 detects that the actual deceleration of the vehicle 100 is greater than the anticipated deceleration during the brake operation (414) at step 402, and detects the steering torque mismatch causing the vehicle 100 to pull left (408) at step 406 and detects no yaw mismatch at step 404, the controller 130 identifies the brake force of the FL brake 111 as too high, and determines that the calibration of the FL, FR and RR brakes 111, 112, 114 is needed to decrease the braking of the FL and RR brakes 111, 114 from the current setting of the FL and RR brakes 111, 114 and to increase the braking of the FR brake 112 from the current setting of the FR brake 112 (step 460). When the controller 130 detects that the actual deceleration of the vehicle 100 is greater than the anticipated deceleration during the brake operation (414) at step 402, detects the steering torque mismatch causing the vehicle 100 to pull right (409) at step 406 and detects no yaw mismatch at step 404, the controller 130 identifies the brake force of the FR brake 112 as too high, and determines that the calibration of the FL and RR brakes 111, 114 is needed to decrease the braking of the FL and RR brakes 111, 114 from the current setting of the FL and RR brakes 111, 114 (step 462).

When the controller 130 detects that the actual deceleration of the vehicle 100 is greater than the anticipated deceleration during the brake operation (414) at step 402, detects the yaw mismatch causing to yaw the vehicle 100 left (411) at step 404 and detects no steering torque mismatch at step 406, the controller 130 identifies the brake force of the RL brake 113 as too high, and determines that the calibration of the RL brake 113 is needed to decrease the braking of the RL brake 113 from the current setting of the RL brake 113 (step 464). When the controller 130 detects that the actual deceleration of the vehicle 100 is greater than the anticipated deceleration during the brake operation (414) at step 402, and detects the yaw mismatch causing to yaw the vehicle 100 left (411) at step 404 and the steering torque mismatch causing the vehicle 100 to pull left (408) at step 406, the controller 130 identifies the brake force of the FL brake 111 as too high, and determines that the calibration of the FL brakes 111 is needed to decrease the braking of the FL brakes 111 from the current setting of the FL brakes 111 (step 466). When the controller 130 detects that the actual deceleration of the vehicle 100 is greater than the anticipated deceleration during the brake operation (414) at step 402, and detects the yaw mismatch causing to yaw the vehicle 100 left (411) at step 404 and the steering torque mismatch causing the vehicle 100 to pull right (409) at step 406, the controller 130 identifies the brake force of the FR brake 112 as far too high, and determines that the calibration of the FL and RL brakes 111, 113 is needed to increase one increment of the braking of the FL brake 111 from the current setting of the FL brake 111 and decrease two increments of the braking of the RL brake 113 from the current setting of the RL brake 113 (step 468).

When the controller 130 detects that the actual deceleration of the vehicle 100 is greater than the anticipated deceleration during the brake operation (414) at step 402, detects the yaw mismatch causing to yaw the vehicle 100 right (412) at step 404 and detects no steering torque mismatch at step 406, the controller 130 identifies the brake force of the RR brake 114 as too high, and determines that the calibration of the RR brake 114 is needed to reduce the braking of the RR brakes 114 from the current setting of the RR brake 114 (step 470). When the controller 130 detects that the actual deceleration of the vehicle 100 is greater than the anticipated deceleration during the brake operation (414) at step 402, and detects the yaw mismatch causing to yaw the vehicle 100 right (412) at step 404 and the steering torque mismatch causing the vehicle 100 to pull left (408) at step 406, the controller 130 identifies the brake force of the FL brake 111 as far too high, and determines that the calibration of the FL, RL and RR brakes 111, 113, 114 is needed to decrease one increment of the braking of the FL brake 111 from the current setting of the FL brake 111, increase two increments of the braking of the RL brake 113 from the current setting of the RL brake 113, and decrease two increments of the braking of the RR brake 114 from the current setting of the RR brake 114 (step 472). When the controller 130 detects that the actual deceleration of the vehicle 100 is greater than the anticipated deceleration during the brake operation (414) at step 402, and detects the yaw mismatch causing to yaw the vehicle 100 right (412) at step 404 and the steering torque mismatch causing the vehicle 100 to pull right (409) at step 406, the controller 130 identifies the brake force of the FR brake 112 as too high, and determines that the calibration of the FR brakes 112 is needed to reduce the braking of the FR brake 112 from the current setting of the FR brake 112 (step 474).

Additionally, the controller 130 can calibrate of the front brakes 111, 112 and the rear brakes 113, 114 to balance between the front brakes 111, 112 and the rear brakes 113, 114 based the operation of the brakes 111, 112, 113, 114 associated with an anti-lock braking system (ABS).

Referring back to FIG. 2, as described, at step 260, the controller 130 determines the adjustment of individual braking of each of the brakes 111, 112, 113, 114 in response to the comparison result of step 250, such as the yaw mismatch, the steering torque mismatch, and/or the deceleration mismatch. The examples of the determinations of the adjustments of the brakes 111, 112, 113, 114 of step 2 are shown in steps 422-474 of FIG. 4 described in detail above.

At step 270, the controller 130 may validate the adjustment of individual braking of each of the brakes 111, 112, 113, 114. For example, the controller 130 checks whether the adjustment of individual braking of each of the brakes 111, 112, 113, 114 determined at step 260 is within a preset range. The present range may be, for instance, but not limited to, a range predetermined by a manufacturer for safety and stored in memory 135 of the vehicle 100.

When the adjustment of individual braking of each of the brakes 111, 112, 113, 114 determined at step 260 is out of the preset range, the controller 130 do not calibrate the brakes 111, 112, 113, 114 based on the adjustment of the brakes 111, 112, 113, 114 determined at step 260 (step 275) and then wait until next brake operation is initiated (step 290). Alternatively, the controller 130 may change the adjustment of individual braking of each of the brakes 111, 112, 113, 114 determined at step 260 to satisfy the preset range.

When the adjustment of individual braking of each of the brakes 111, 112, 113, 114 determined at step 260 is within the preset range, the controller 130 calibrates the brakes 111, 112, 113, 114 based on the adjustment of individual braking of each of the brakes 111, 112, 113, 114 determined at step 260 (step 280) and then wait until next brake operation is initiated (step 290). For example, the controller 130 may change the brake characteristic parameters for controlling each of the brakes 111, 112, 113, 114, stored in the memory 135 to reflect the adjustment of individual braking of each of the brakes 111, 112, 113, 114 determined at step 260.

Steps 210 to 290 of FIG. 2 can be repeated until However, the loop time may be set longer than a predetermined time period to avoid braking adjustments based on surface friction and terrain.

According to some embodiments of the present disclosure, the control system may prevent pulling the vehicle to one side without driver's countering steer and may improve vehicle stability, yaw control and safety. Certain embodiments of the present disclosure may provide a reliable and cost-effective way of diagnosing brake system abnormalities and automatically calibrate the brakes. Additionally, in some embodiments of the present disclosure, vehicle braking systems may be developed with much lower brake accuracy requirements and direct pad force measurement sensors may not be needed. Certain embodiments of the present disclosure may keep vehicle side-to-side brake forces balanced and maintain the desired total braking force and vehicle deceleration.

Certain embodiments of the present disclosure described above can be applied to traction control to prevent loss of traction of driven road wheels 101 to 104. For example, the vehicle 100 may have a plurality of motors which are respectively coupled to each of the vehicle wheels 101 to 104 to provide a rotation force to a corresponding vehicle wheel. The memory 135 stores power characteristic parameters for controlling each of the motors. The power characteristic parameters may include, for instance, but not limited to, parameters related to power, a rotation speed and/or a rotation torque of the motor. The controller 130 can calibrate each of the motors operably coupled to a corresponding vehicle wheel 101 to 104 for the traction control by adjusting the power characteristic parameters of each of the motors stored in the memory 135 in response to a yaw mismatch/difference between the anticipated yaw and the actual yaw of the vehicle 100, a steering torque mismatch/difference between the anticipated steering torque and the actual steering torque of the vehicle 100, and a deceleration mismatch/difference between the anticipated deceleration and the actual deceleration of the vehicle 100.

FIG. 5 illustrates a block diagram illustrating components of an example computing device 500, such as the controller 130 shown in FIG. 1. FIG. 5 illustrates only one particular example of the controller 130, and many other examples of the controller 130 may be used in other instances.

As shown in the specific example of FIG. 5, the computing device 500 may include one or more processors 502, memory 504, network interface 506, one or more storage devices 508, user interface 510, short-range wireless communication module 512, wireless communication module 514, and power source 516. Computing device 500 may also include operating system 518, which may include modules and/or applications that are executable by one or more processors 502 and computing device 500. Each of the components 502, 504, 506, 508, 510, 512, 514, 516, and 518 may be interconnected (physically, communicatively, and/or operatively) for inter-component communications.

One or more processors 502, in one example, may be configured to implement functionality and/or process instructions for execution within computing device 500. For example, one or more processors 502 may be capable of processing instructions stored in memory 304 or instructions stored on one or more storage devices 508. These instructions may define or otherwise control the operation of operating system 518.

Memory 504 may, in one example, be configured to store information within computing device 500 during operation. Memory 504, in some examples, may be described as a computer-readable storage medium. In some examples, memory 504 may be a temporary memory, meaning that a primary purpose of memory 504 is not long-term storage. Memory 504 may, in some examples, be described as a volatile memory, meaning that memory 504 does not maintain stored contents when computing device 500 is turned off. Examples of volatile memories may include random access memories (RAM), dynamic random access memories (DRAM), static random access memories (SRAM), and other forms of volatile memories known in the art. In some examples, memory 504 may be used to store program instructions for execution by one or more processors 502. Memory 504 may, in one example, be used by software or applications running on computing device 500 to temporarily store information during program execution.

One or more storage devices 508 may, in some examples, also include one or more computer-readable storage media. One or more storage devices 508 may be configured to store larger amounts of information than memory 504. One or more storage devices 508 may further be configured for long-term storage of information. In some examples, one or more storage devices 308 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

Computing device 500 may, in some examples, also include network interface 306. Computing device 500 may, in one example, use network interface 306 to communicate with external devices via one or more networks. Network interface 506 may be a network interface card, such as an Ethernet card, an optical transceiver, a radio frequency transceiver, or any other type of device that can send and receive information. Other examples of such network interfaces may include Bluetooth, 5G and Wi-Fi radios in mobile computing devices as well as universal serial bus (USB). In some examples, computing device 500 may the network interface 506 to wirelessly communicate with an external device such as a server, mobile phone, or other networked computing device.

Computing device 500 may, in one example, also include user interface 510. User interface 510 may be configured to receive input from a user (e.g., tactile, audio, or video feedback). User interface 510 may include a touch-sensitive and/or a presence-sensitive screen or display, mouse, a keyboard, a voice responsive system, or any other type of device for detecting a command from a user. In some examples, user interface 510 may include a touch-sensitive screen, mouse, keyboard, microphone, or camera.

User interface 510 may also include, combined or separate from input devices, output devices. In this manner, user interface 510 may be configured to provide output to a user using tactile, audio, or video stimuli. In one example, user interface 510 may include a touch-sensitive screen or display, sound card, a video graphics adapter card, or any other type of device for converting a signal into an appropriate form understandable to humans or machines. In addition, user interface 510 may include a speaker, a cathode ray tube (CRT) monitor, a liquid crystal display (LCD), or any other type of device that can generate intelligible output to a user.

Computing device 500, in some examples, may include power source 516, which may be a rechargeable battery and may provide power to computing device 500. Power source 516 may, in some examples, be a battery made from nickel-cadmium, lithium-ion, or other suitable material. In other examples, power source 516 may be a power source capable of providing stored power or voltage from another power source.

In addition, computing device 500 may include short-range wireless communication module 512. Short-range wireless communication module 512 may be active hardware that is configured to communicate with other short-range wireless communication modules. Examples of short-range wireless communication module 512 may include an NFC module, an RFID module, and the like. In general, short-range wireless communication module 512 may be configured to communicate wirelessly with other devices in physical proximity to short-range wireless communication module 512 (e.g., less than approximately ten centimeters, or less than approximately four centimeters). In other examples, short-range wireless communication module 512 may be replaced with an alternative short-range communication device configured to communicate with and receive data from other short-range communication devices. These alternative short-range communication devices may operate according to Bluetooth, Ultra-Wideband radio, or other similar protocols. In some examples, short-range wireless communication module 512 may be an external hardware module that is coupled with computing device 500 via a bus (such as via a Universal Serial Bus (USB) port), short-range wireless communication module 512, in some examples, may also include software which may, in some examples, be independent from operating system 518, and which may, in some other examples, be a sub-routine of operating system 518.

The computing device 500, in some examples, may also include wireless communication module 514. Wireless communication module 514 may, in some examples, may be a device operable to exchange data with other wireless communication modules over short distances (e.g., less than or equal to ten meters). Examples of wireless communication module 214 may include a Bluetooth module, a WiFi direct module, and the like.

Computing device 500 may also include operating system 518. Operating system 318 may, in some examples, control the operation of components of computing device 500. For example, operating system 518 may, in one example, facilitate the interaction with one or more processors 502, memory 504, network interface 506, one or more storage devices 508, user interface 510, short-range wireless communication module 512, wireless communication module 314, and power source 516.

Any applications implemented within or executed by computing device 500 may be implemented or contained within, operable by, executed by, and/or be operatively/communicatively coupled to components of computing device 500 (e.g., one or more processors 502, memory 504, network interface 506, one or more storage devices 508, user interface 510, short-range wireless communication module 512, wireless communication module 514, and/or power source 516).

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. A control system for a vehicle having a plurality of vehicle wheels, the system comprising:
    a plurality of brakes, wherein each of the brakes is configured to apply individual braking to a respective one of the vehicle wheels;
    memory configured to store brake characteristic parameters for controlling each of the brakes; and
    a processor configured to:
    calculate anticipated yaw of the vehicle, anticipated steering torque of the vehicle, and anticipated deceleration of the vehicle, which are associated with operation of the brakes;
    compare between the anticipated yaw and actual yaw of the vehicle, between the anticipated steering torque and actual steering torque of the vehicle, and between the anticipated deceleration and actual deceleration of the vehicle; and
    calibrate the brakes by adjusting the stored brake characteristic parameters of each of the brakes in response to a yaw difference between the anticipated yaw and the actual yaw of the vehicle, a steering torque difference between the anticipated steering torque and the actual steering torque of the vehicle, and a deceleration difference between the anticipated deceleration and the actual deceleration of the vehicle.

2. The control system of claim 1, wherein:
    the plurality of brakes comprise a front left brake and a front right brake, and
    the processor is configured to adjust the stored brake characteristic parameters of the front left and front right brakes in response to the steering torque difference between the anticipated steering torque and the actual steering torque of the vehicle.

3. The control system of claim 1, wherein:
    the plurality of brakes comprise left side brakes and right side brakes, and
    the processor is configured to adjust the stored brake characteristic parameters of the left and right side brakes to balance between the left side brakes and the right side brakes in response to the yaw difference between the anticipated yaw and the actual yaw of the vehicle.

4. The control system of claim 1, wherein the processor is configured to adjust the stored brake characteristic parameters of all of the brakes in response to the deceleration difference between the anticipated deceleration and the actual deceleration of the vehicle.

5. The control system of claim 1, wherein:
    the plurality of brakes comprise:
    left side brakes comprising a front left brake and a rear left brake, and
    right side brakes comprising a front right brake and a rear right brake; and
    the processor is configured to:
    adjust the stored brake characteristic parameters of the front left and front right brakes in response to the steering torque difference between the anticipated steering torque and the actual steering torque of the vehicle, and
    adjust the stored brake characteristic parameters of the left and right side brakes to balance between the left side brakes and the right side brakes in response to the yaw difference between the anticipated yaw and the actual yaw of the vehicle.

6. The control system of claim 5, wherein the processor is configured to adjust the stored brake characteristic parameters of all of the brakes in response to the deceleration difference between the anticipated deceleration and the actual deceleration of the vehicle.

7. The control system of claim 1, wherein the processor is configured to, when detecting the steering torque difference between the anticipated steering torque and the actual steering torque of the vehicle causing the vehicle to pull left, adjust the stored brake characteristic parameters of one or both of the front left brake and the front right brake to decrease braking of the front left brake and/or increase braking of the front right brake.

8. The control system of claim 1, wherein the processor is configured to, when detecting the steering torque difference between the anticipated steering torque and the actual steering torque of the vehicle causing the vehicle to pull right, adjust the stored brake characteristic parameters of one or both of the front left brake and the front right brake to increase braking of the front left brake and/or to decrease braking of the front right brake.

9. The control system of claim 1, wherein:
the plurality of brakes comprise left side brakes and right side brakes, and
the processor is configured to, when detecting the yaw difference between the anticipated yaw and the actual yaw of the vehicle causing to yaw the vehicle left, adjust the stored brake characteristic parameters of one or more of the left and right side brakes to decrease braking of the left side brakes and/or to increase braking of the right side brakes.

10. The control system of claim 1, wherein:
the plurality of brakes comprise left side brakes and right side brakes, and
the processor is configured to, when detecting the yaw difference between the anticipated yaw and the actual yaw of the vehicle causing to yaw the vehicle right, adjust the stored brake characteristic parameters of one or more of the left and right side brakes to increase braking of the left side brakes and/or to decrease braking of the right side brakes.

11. The control system of claim 1, wherein the processor is configured to, when the actual deceleration of the vehicle is less than the anticipated deceleration of the vehicle, adjust the stored brake characteristic parameters of one or more of the brakes to increase braking of the brakes.

12. The control system of claim 1, wherein the processor is configured to, when the actual deceleration of the vehicle is greater than the anticipated deceleration of the vehicle, adjust the stored brake characteristic parameters of one or more of the brakes to decrease braking of the brakes.

13. The control system of claim 1, wherein the processor is configured to, calculate the anticipated yaw of the vehicle, the anticipated steering torque, and the anticipated deceleration of the vehicle after a predetermined time period from initiation of brake operation elapses.

14. The control system of claim 1, wherein the processor is configured to check whether the adjusted brake characteristic parameters of each of the brakes are within a preset range.

15. The control system of claim 1, wherein:
the plurality of brakes comprise front brakes and rear brakes, and
the processor is configured to calibrate of the front brakes and the rear brakes to balance between the front brakes and the rear brakes based on operation of the brakes associated with an anti-lock braking system (ABS).

16. A computer-implemented method for controlling a vehicle having a plurality of vehicle wheels, the method comprising:
calculating anticipated yaw of the vehicle, anticipated steering torque of the vehicle, and anticipated deceleration of the vehicle, which are associated with operation of a plurality of brakes, wherein each of the brakes is configured to apply individual braking to a respective one of the vehicle wheels;
comparing between the anticipated yaw and actual yaw of the vehicle, between the anticipated steering torque and actual steering torque of the vehicle, and between the anticipated deceleration and actual deceleration of the vehicle; and
calibrating the brakes by adjusting brake characteristic parameters of each of the brakes, stored in memory for controlling each of the brakes, in response to a yaw difference between the anticipated yaw and the actual yaw of the vehicle, a steering torque difference between the anticipated steering torque and the actual steering torque of the vehicle, and a deceleration difference between the anticipated deceleration and the actual deceleration of the vehicle.

17. The method of claim 16, wherein:
the plurality of brakes comprise a front left brake and a front right brake, and
the calibrating the brakes comprises adjusting the stored brake characteristic parameters of the front left and front right brakes in response to the steering torque difference between the anticipated steering torque and the actual steering torque of the vehicle.

18. The method of claim 16, wherein:
the plurality of brakes comprise left side brakes and right side brakes, and
the calibrating the brakes comprises adjusting the stored brake characteristic parameters of the left and right side brakes to balance between the left side brakes and the right side brakes in response to the yaw difference between the anticipated yaw and the actual yaw of the vehicle.

19. The method of claim 16, wherein the calibrating the brakes comprises adjusting the stored brake characteristic parameters of all of the brakes in response to the deceleration difference between the anticipated deceleration and the actual deceleration of the vehicle.

20. The method of claim 16, wherein:
the plurality of brakes comprise front brakes and rear brakes, and
the calibrating the brakes comprises adjusting the stored brake characteristic parameters of the front brakes and the rear brakes to balance between the front brakes and the rear brakes based on operation of the brakes associated with an anti-lock braking system (ABS).

* * * * *